(12) United States Patent
Miwa et al.

(10) Patent No.: US 8,933,174 B2
(45) Date of Patent: Jan. 13, 2015

(54) THERMOPLASTIC POLYMER COMPOSITION

(75) Inventors: Nobuhiro Miwa, Ibaraki (JP); Kenji Shachi, Ibaraki (JP)

(73) Assignee: Kurarary Co., Ltd., Kurashiki-shi (JP)

( * ) Notice: Subject to any disclaimer, the term of this patent is extended or adjusted under 35 U.S.C. 154(b) by 210 days.

(21) Appl. No.: 12/598,600

(22) PCT Filed: May 23, 2008

(86) PCT No.: PCT/JP2008/059540
§ 371 (c)(1),
(2), (4) Date: Nov. 3, 2009

(87) PCT Pub. No.: WO2008/146739
PCT Pub. Date: Dec. 4, 2008

(65) Prior Publication Data
US 2010/0152386 A1    Jun. 17, 2010

(30) Foreign Application Priority Data

May 25, 2007    (JP) .................................. 2007-138936

(51) Int. Cl.
C08L 53/02    (2006.01)
C08L 23/06    (2006.01)
C08F 8/04    (2006.01)
C08L 23/10    (2006.01)

(52) U.S. Cl.
CPC . *C08F 8/04* (2013.01); *C08L 23/10* (2013.01); *C08L 53/02* (2013.01); *C08L 53/025* (2013.01); *C08L 23/06* (2013.01)
USPC .............................. 525/314; 525/98; 525/338

(58) Field of Classification Search
CPC ......... C08F 8/04; C08L 53/02; C08L 53/025; C08L 23/10
USPC .......................................... 525/98, 314, 338
See application file for complete search history.

(56) References Cited

U.S. PATENT DOCUMENTS

| | | | | |
|---|---|---|---|---|
| 4,140,162 | A * | 2/1979 | Gajewski et al. ............ | 428/35.5 |
| 4,588,777 | A * | 5/1986 | Hotta ............................... | 525/93 |
| 5,073,447 | A * | 12/1991 | Mizuno et al. ................. | 428/327 |
| H2096 | H * | 1/2004 | Erderly et al. ................... | 525/98 |
| 2002/0013440 | A1* | 1/2002 | Agarwal et al. ................ | 526/335 |
| 2002/0061981 | A1 | 5/2002 | Donald et al. | |
| 2004/0092666 | A1 | 5/2004 | Kitano et al. | |

FOREIGN PATENT DOCUMENTS

| | | |
|---|---|---|
| JP | 5 345841 | 12/1993 |
| JP | 11 335498 | 12/1999 |
| JP | 2001 158812 | 6/2001 |
| JP | 2002 119614 | 4/2002 |
| JP | 2002 173562 | 6/2002 |
| JP | 2003 502471 | 1/2003 |
| JP | 2004 2657 | 1/2004 |
| JP | 2004 91529 | 3/2004 |
| JP | 2004 91530 | 3/2004 |
| JP | 2004 91531 | 3/2004 |
| JP | 2004 231820 | 8/2004 |
| JP | 2005 232246 | 9/2005 |
| JP | 2006 233126 | 9/2006 |
| JP | 2006 249125 | 9/2006 |
| WO | WO 83/00158 | 1/1983 |
| WO | 02 14423 | 2/2002 |
| WO | WO 2005075556 A1 * | 8/2005 .............. C08L 23/02 |

OTHER PUBLICATIONS

Machine Translation of 2004-091531 (2011).*
Fetters, L. et al., "Synthesis and Properties of Block Polymers: Poly-alpha-Methylstyrene-Polyisoprene-Poly-alpha Methylstyrene", Macromolecules, vol. 2, No. 5, pp. 453-458 (Sep.-Oct. 1969).
Mistrali, F. et al., "Long Term Elastic Properties of alpha Methylstyrene-Diene Teleblock Copolymers", Kautschuk+Gummi Kunststoffe, vol. 37, No. 5/84, pp. 377-379, (1984).
Gandini, A. et al., "Synthesis and Characterization of alpha Methylstyrene -Butadiene-alpha-Methylstyrene Linear Block Copolymers", Polymer Bulletin vol. 12, pp. 71-77 (1984).

* cited by examiner

*Primary Examiner* — Mark Kaucher
(74) *Attorney, Agent, or Firm* — Oblon, Spivak, McClelland, Maier & Neustadt, L.L.P.

(57) ABSTRACT

A thermoplastic polymer composition has good flexibility, lightweight properties, moldability, and heat resistance, and in particular, is excellent in wear resistance. The thermoplastic polymer composition includes: at least one block copolymer (a) selected from among an α-methylstyrene based block copolymer having a number average molecular weight of 30,000 to 500,000 and a hydrogenated product thereof, the α-methylstyrene based block copolymer including a polymer block A mainly composed of an α-methylstyrene unit and a polymer block B mainly composed of a conjugated diene unit; a propylene-based polymer (b); and an ethylene-based polymer (c) having a density of 0.94 g/cm³ or less, in a ratio satisfying the following inequalities (1) and (2):

$$0.1 \leq W(a)/[W(a)+W(b)+W(c)] \leq 0.8 \quad (1)$$

$$1 \leq W(b)/W(c) \quad (2)$$

wherein W(a), W(b), and W(c) represent the masses of the block copolymer (a), the propylene-based polymer (b), and the ethylene-based polymer (c), respectively.

18 Claims, No Drawings

THERMOPLASTIC POLYMER COMPOSITION

TECHNICAL FIELD

The present invention relates to a thermoplastic polymer composition containing a block copolymer having a polymer block mainly composed of α-methylstyrene units.

BACKGROUND TECHNOLOGY

Styrene-based thermoplastic elastomers have rubber elasticity at room temperature, exhibit excellent physical properties such as flexibility and moldability, have low specific gravity, and also exhibit excellent recyclability. Therefore, in relation to problems such as environmental pollution, such elastomers are recently being used as a substitute for vulcanized rubber and polyvinyl chloride in various areas such as vehicle parts, industrial parts, sundry goods, and sport applications.

Among the styrene-based thermoplastic elastomers, styrene-butadiene-styrene (SBS) block copolymers, styrene-isoprene-styrene (SIS) block copolymers, and hydrogenated products thereof are widely used because of their low cost, excellent flexibility, rubber elasticity, recyclability, and other properties.

Studies have been made to improve various properties of styrene-based thermoplastic elastomer compositions, and the following compositions (1) to (8), for example, have been proposed:
(1) a composition containing a polyolefin-based resin and a hydrogenated product of a block copolymer including a polymer block mainly composed of α-methylstyrene and a polymer block composed of isoprene and/or butadiene, the composition having a good balance of heat resistance and flowability (see Patent Document 1);
(2) a composition containing a softener, an acrylic polymer, and a hydrogenated product of a block copolymer including a polymer block mainly composed of α-methylstyrene and a polymer block composed of isoprene and/or butadiene, the composition being excellent in scratch resistance and wear resistance (see Patent Document 2);
(3) a thermoplastic resin composition containing a polyolefin-based resin, an acrylic resin, a hydrocarbon-based softener, a hydrogenated product of a thermoplastic block copolymer that includes a block composed of aromatic vinyl monomers and a block composed of isoprene and/or butadiene, and a hydrogenated product of a thermoplastic block copolymer that has a polymer of acrylic monomers in its side chain and includes a block composed of aromatic vinyl monomers and a block composed of isoprene and/or butadiene, the composition being excellent in flexibility and weather resistance and being capable of providing good appearance (see Patent Document 3);
(4) a thermoplastic elastomer resin composition for powder molding, containing: a styrene-based thermoplastic elastomer, a softener, a peroxide-decomposable olefin-based resin, an unsaturated glycidyl compound, an unsaturated carboxylic acid, a composition obtained by dynamic crosslinking of liquid polybutadiene, and at least one material selected from the group consisting of polyester polymers, polyurethane polymers, and polyamide polymers; wherein the thermoplastic elastomer resin composition is obtained by kneading the composition obtained by the dynamic crosslinking with a compound having a specific structure or by adding the compound having the specific structure before the dynamic crosslinking; the elastomer resin composition being used to obtain a molded product having a soft touch and good scratch resistance (see Patent Document 4);
(5) a thermoplastic resin composition for a golf ball, containing a styrene-based thermoplastic elastomer, a softener, a peroxide-crosslinkable olefin-based resin, a peroxide-decomposable olefin-based resin, and an organic peroxide, the composition having excellent moldability and wear resistance (see Patent Document 5);
(6) a thermoplastic elastomer composition containing an ethylene-based copolymer, a styrene-based thermoplastic elastomer, and other components, the composition being excellent in flexibility, wear resistance, lightweight properties, and mechanical strength properties (see Patent Document 6);
(7) a resin composition for powder molding, including a polypropylene-based resin, an olefin-based thermoplastic elastomer, a styrene-based thermoplastic elastomer, and a silicone oil-containing olefin-based resin, the composition being excellent in wear resistance and releasability after powder molding (see Patent Document 7); and
(8) a composition including an ethylene-α-olefin-based copolymer rubber, a propylene-based resin, an aromatic vinyl compound-conjugated diene compound copolymer rubber having a specific structure, and a silicone oil or silicone rubber, the composition and a molded product thereof being excellent in wear resistance and scratch resistance (see Patent Document 8).

The above composition of Patent Document 1 has excellent heat resistance and flowability, but its wear resistance is not fully satisfactory. The compositions of Patent Documents 2 and 3 are flexible and have excellent moldability and transparency while the surface characteristics such as surface hardness, weather resistance, transparency, and other properties of the acrylic-based resins are maintained. However, since the acrylic-based resins have hygroscopicity, a drying step or a similar step is required before molding, and therefore the molding process is complicated. Patent Document 3 discloses the evaluation results of pencil scratch test performed according to JIS K5400 on the proposed compositions. However, the evaluation results for scratch resistance and wear resistance are not fully satisfactory.

Patent Document 4 discloses the results of hardness evaluation performed according to JIS K6253 on the proposed compositions. However, the evaluation results for scratch resistance and wear resistance are not fully satisfactory, and the hydrolysis resistance and weather resistance are not sufficient. Therefore, the molded products made of these compositions have problems such as a reduction in performance and yellowing. Patent Document 5 discloses the Taber abrasion values of the proposed compositions that relate to wear resistance, but the values thereof are not fully satisfactory. In addition to this, these compositions require dynamic crosslinking and therefore are inferior in moldability.

Patent Document 6 discloses the DIN abrasion values of the proposed compositions that are used for wear resistance evaluation, but the values thereof are not fully satisfactory. Patent Documents 7 and 8 disclose the evaluation results of the properties of the molded surfaces of the proposed compositions before and after abrasion test using an unbleached muslin No. 3 cloth, but the results of wear resistance evaluation are not fully satisfactory. Moreover, the silicone oil and silicone rubber cause a bleeding problem on the molded surface.

Patent Document 1: Japanese Patent Application Laid-Open No. 2004-91531
Patent Document 2: Japanese Patent Application Laid-Open No. 2004-2657

Patent Document 3: Japanese Patent Application Laid-Open No. Hei 5-345841

Patent Document 4: Japanese Patent Application Laid-Open No. 2001-158812

Patent Document 5: Japanese Patent Application Laid-Open No. 2002-119614

Patent Document 6: Japanese Patent Application Laid-Open No. Hei 11-335498

Patent Document 7: Japanese Patent Application Laid-Open No. 2004-231820

Patent Document 8: Japanese Patent Application Laid-Open No. 2002-173562

DISCLOSURE OF THE INVENTION

Problems to be Solved by the Invention

It is an object of the present invention to provide a thermoplastic polymer composition having good flexibility, lightweight properties, moldability, and heat resistance and, in particular, being excellent in wear resistance.

Means for Solving the Problems

The present invention has achieved the above object by providing a thermoplastic polymer composition comprising: at least one block copolymer (a) selected from among an α-methylstyrene-based block copolymer having a number average molecular weight of 30,000 to 500,000 and a hydrogenated product thereof, the α-methylstyrene-based block copolymer including a polymer block A mainly composed of an α-methylstyrene unit and a polymer block B mainly composed of a conjugated diene unit; a propylene-based polymer (b); and an ethylene-based polymer (c) having a density of 0.94 g/cm$^3$ or less, in a ratio satisfying the following inequalities (1) and (2):

$$0.1 \leq W(a)/[W(a)+W(b)+W(c)] \leq 0.8 \quad (1)$$

$$1 \leq W(b)/W(c) \quad (2)$$

wherein W(a), W(b), and W(c) represent masses of the block copolymer (a), the propylene-based polymer (b), and the ethylene-based polymer (c), respectively.

The present invention encompasses, as the preferred embodiment, the above thermoplastic polymer composition wherein the block copolymer (a) is at least one selected from among the α-methylstyrene-based block copolymer and the hydrogenated product thereof, the α-methylstyrene-based block copolymer including the polymer block A having a number average molecular weight of 1,000 to 50,000, and the polymer block B that includes: a block b1 having a number average molecular weight of 1,000 to 30,000 and including a conjugated diene unit in which an amount of 1,4-bonds is less than 30 mole percent; and a block b2 having a number average molecular weight of 10,000 to 400,000 and including a conjugated diene unit in which an amount of 1,4-bonds is 30 mole percent or more, and wherein the α-methylstyrene-based block copolymer includes an (A-b1-b2) structure.

The present invention also encompasses, as the preferred embodiment, the above thermoplastic polymer composition, wherein the ethylene-based polymer (c) is produced using a metallocene-based catalyst.

Effects of the Invention

The thermoplastic polymer composition of the present invention has good flexibility, lightweight properties, moldability, and heat resistance and, in particular, is excellent in wear resistance. Therefore, the thermoplastic polymer composition of the present invention can provide molded products having not only good flexibility, lightweight properties, moldability, and heat resistance but also excellent wear resistance in particular.

BEST MODE FOR CARRYING OUT THE INVENTION

A thermoplastic polymer composition of the present invention includes a block copolymer (a), a propylene-based polymer (b), and an ethylene-based polymer (c).

The block copolymer (a) is at least one block copolymer selected from among an α-methylstyrene-based block copolymer including a polymer block A mainly composed of an α-methylstyrene unit and a polymer block B mainly composed of a conjugated diene unit; and a hydrogenated product thereof. In the hydrogenated products, the polymer blocks A and B may be independently hydrogenated. In the present description, unless otherwise distinguished, a non-hydrogenated polymer block A and a hydrogenated polymer block A are collectively called as the "polymer block A," and a non-hydrogenated polymer block B and a hydrogenated polymer block B are collectively called as the "polymer block B." The term "structural units" (described later) that constitute these polymer blocks is used to include hydrogenated structural units.

It is important, in terms of mechanical performance, moldability, wear resistance, and other properties, that the number average molecular weight of the α-methylstyrene-based block copolymer including the polymer block A mainly composed of the α-methylstyrene unit and the polymer block B mainly composed of the conjugated diene unit is in the range of 30,000 to 500,000. The number average molecular weight is preferably in the range of 35,000 to 480,000 and more preferably in the range of 40,000 to 440,000. The number average molecular weight of the hydrogenated product depends on the molecular structure of the α-methylstyrene-based block copolymer and the hydrogenation ratio and is preferably in the range of 30,000 to 500,000, more preferably in the range of 35,000 to 480,000, and still more preferably in the range of 40,000 to 440,000. Therefore, the number average molecular weight of the block copolymer (a) comprising at least one of these block copolymers is desirably 30,000 to 500,000. When the number average molecular weight is less than 30,000, the wear resistance and mechanical performance of the obtained thermoplastic polymer composition tend to be impaired. When the number average molecular weight is greater than 500,000, the moldability of the obtained thermoplastic polymer composition tends to be impaired.

No particular limitation is imposed on the polymer block A included in the block copolymer (a) so long as it is mainly composed of the α-methylstyrene unit, i.e., the α-methylstyrene unit is its main component. Preferably, in terms of the flexibility and mechanical properties of the obtained thermoplastic polymer composition, 90 percent by mass or more of the polymer block A is composed of structural units derived from α-methylstyrene. More preferable, the polymer block A is composed solely of structural units derived from α-methylstyrene.

So long as the achievement of the object and effects of the present invention are not impeded, the polymer block A may contain one or two or more types of unsaturated monomers other than α-methylstyrene, such as structural units derived from butadiene, isoprene, 2,3-dimethyl-1,3-butadiene, 1,3-pentadiene, 1,3-hexadiene, isobutylene, styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylene norbornene, 2-methylene tetrahydrofuran, and the like. It is preferable, in terms of the flexibility and mechanical properties of the obtained thermoplastic polymer composition, that the amount of the structural units derived from unsaturated monomers other than α-methylstyrene be small, preferably 10 percent by mass or less based on the amount of the polymer block A. The polymer block A may contain structural units other than α-methylstyrene units in any of random, block, and tapered forms.

No particular limitation is imposed on the number average molecular weight of the polymer block A in the block copolymer (a). The number average molecular weight before hydrogenation is preferably in the range of 1,000 to 50,000 and more preferably in the range of 2,000 to 40,000. When the number average molecular weight of the polymer block A (before hydrogenation) is less than 1,000, the wear resistance and mechanical performance of the obtained thermoplastic polymer composition tend to be impaired. When the number average molecular weight (before hydrogenation) is greater than 50,000, the moldability and wear resistance of the obtained thermoplastic polymer composition tend to be impaired. As used herein, the number average molecular weight is a molecular weight determined by gel permeation chromatography (GPC) measurement relative to polystyrene standard. Specifically, the method described later in Examples may be used.

Preferably, the block copolymer (a) contains the polymer block A in an amount ranging from 10 to 50 percent by mass. When the amount of the polymer block A is less than 10 percent by mass, the wear resistance and mechanical performance of the obtained thermoplastic polymer composition tend to be impaired. When the amount is greater than 50 percent by mass, the flexibility of the obtained thermoplastic polymer composition tends to be impaired. The amount of the polymer block A contained in the block copolymer (a) can be determined using, for example, $^1$H-NMR spectra.

No particular limitation is imposed on the polymer block B included in the block copolymer (a) so long as it is mainly composed of the conjugated diene unit, i.e., the conjugated diene unit is its main component. Preferably, in terms of the flexibility and mechanical properties of the obtained thermoplastic polymer composition, 90 percent by mass or more of the polymer block B is composed of structural units derived from a conjugated diene. More preferably, the polymer block B is composed solely of structural units derived from a conjugated diene. Examples of the conjugated diene unit constituting the polymer block B include structural units derived from butadiene, isoprene, 2,3-dimethyl-1,3-butadiene, 1,3-pentadiene, 1,3-hexadiene, and the like. These conjugated dienes may be used singly or in combination of two or more. Preferably, the polymer block B may comprise a butadiene unit or an isoprene unit or both the butadiene unit and isoprene unit.

So long as the gist of the present invention is not impaired, the polymer block B may contain a small amount, preferably 10 percent by mass or less based on the amount of the polymer block B, of an anionic polymerizable monomer other than the conjugated diene, such as a structural unit derived from styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylene norbornene, 2-methylene tetrahydrofuran, or the like. The polymer block B may contain such a structural unit in any of random, block, and tapered forms.

No particular limitation is imposed on the number average molecular weight of the polymer block B. The number average molecular weight before hydrogenation is preferably in the range of 10,000 to 500,000, more preferably in the range of 20,000 to 400,000, and still more preferably in the range of 30,000 to 300,000. When the number average molecular weight of the polymer block B (before hydrogenation) is less than 10,000, the wear resistance and mechanical performance of the obtained thermoplastic polymer composition tend to be impaired. When the number average molecular weight (before hydrogenation) is greater than 500,000, the moldability of the obtained thermoplastic polymer composition tends to be impaired.

In the polymer block B in the block copolymer (a), preferably 50 mole percent or more of carbon-carbon double bonds originating from the conjugated diene unit are hydrogenated from the viewpoint of heat resistance and weather resistance. More preferably 70 mole percent or more, and still more preferably 90 mole percent or more of carbon-carbon double bonds are hydrogenated. The above hydrogenation ratio can be determined from measurement values obtained by measuring the amount of the carbon-carbon double bonds originating from the conjugated diene unit in the polymer block B before and after hydrogenation by means of iodine value measurement, infrared spectrometer, $^1$H-NMR, and the like.

No particular limitation is imposed on the type of linkage of the polymer block A and the polymer block B in the block copolymer (a) so long as they are bonded to each other. The type of linkage may be linear, branched, radial, or a combination of two or more thereof. Of these, the type of linkage of the polymer block A and the polymer block B is preferably linear. When A indicates the polymer block A, and B indicates the polymer block B, examples of such a block copolymer (a) include triblock copolymers represented by A-B-A, tetrablock copolymers represented by A-B-A-B, pentablock copolymers represented by A-B-A-B-A, and (A-B)$_n$X-type copolymers (wherein X represents a residue of a coupling agent, and n is an integer of 2 or more). These block copolymers may be used singly or as a mixture of two or more. Of these, triblock copolymers represented by A-B-A are preferably used because of their flexibility, ease of manufacturing the block copolymer (a), and the like.

Preferably, to improve the characteristics of the thermoplastic polymer composition over a wide temperature range, the block copolymer (a) is at least one selected from among an α-methylstyrene-based block copolymer and a hydrogenated product thereof (hereinafter, this block copolymer may be referred to as a block copolymer (a')). The α-methylstyrene-based block copolymer includes a polymer block A having a number average molecular weight of 1,000 to 50,000 and a polymer block B that includes: a block b1 having a number average molecular weight of 1,000 to 30,000 and including a conjugated diene unit in which the amount of 1,4-bonds is less than 30 mole percent; and a block b2 having a number average molecular weight of 10,000 to 400,000 and including a conjugated diene unit in which the amount of 1,4-bonds is 30 mole percent or more. The α-methylstyrene-based block copolymer includes an (A-b1-b2) structure. Examples of the block copolymer (a') include A-b1-b2-b2-b1-A type copolymers (which may further include a residue of a coupling agent in their molecules), mixtures of A-b1-b2-b1-A type copolymers (which may further include a residue of a coupling agent in their molecules) and A-b1-b2 type copolymers (which may further include a residue of a coupling agent in their molecules), and (A-b1-b2)$_n$X type copolymers (wherein X represents a residue of a coupling agent, and n is an integer of 2 or more).

The number average molecular weight of the polymer block b1 in the block copolymer (a') is preferably in the range of 1,000 to 30,000 and more preferably in the range of 2,000 to 25,000. The amount of the 1,4-bonds in the conjugated diene unit constituting the polymer block b1 is preferably less than 30 mole percent. The number average molecular weight of the polymer block b2 is preferably in the range of 10,000 to 400,000 and more preferably in the range of 20,000 to 400,000. The amount of the 1,4-bonds in the conjugated diene unit constituting the polymer block b2 is preferably 30 mole percent or more, more preferably 35 to 95 mole percent, and still more preferably 40 to 80 mole percent. As described above, the term "conjugated diene unit" is used to include a hydrogenated conjugated diene unit.

So long as the gist of the present invention is not impaired, the block copolymer (a) may contain, in its molecular chain or at its molecular terminal, one or two or more functional groups such as a carboxyl group, a hydroxyl group, an acid anhydride group (a group represented by a formula —CO—O—CO—), an amino group, and an epoxy group. A mixture of a block copolymer (a) having the above functional group and a block copolymer (a) not having the above functional group may be used as the above block copolymer (a).

The block copolymer (a) can be manufactured by an anionic polymerization method. For example, a manufacturing method including any of the following processes <1> to <4> may be used for manufacturing:

<1> a process for obtaining a block copolymer (such as a triblock copolymer represented by A-B-A) by polymerizing a conjugated diene in a polar solvent such as tetrahydrofuran using a dianionic initiator such as 1,4-dilithio-1,1,4,4-tetraphenyl butane and sequentially polymerizing α-methylstyrene at low temperature (for example, at a temperature of about −78° C.) (see, for example, Macromolecules, vol. 2, pp. 453-458 (1969));

<2> a process for obtaining a block copolymer (such as an (A-B)$_n$X type block copolymer) by polymerizing α-methylstyrene in a nonpolar solvent such as cyclohexane using an anionic polymerization initiator such as sec-butyl lithium, polymerizing a conjugated diene, and performing a coupling reaction by adding a coupling agent such as tetrachlorosilane or diphenyldichlorosilane (α,α'-dichloro-p-xylene, phenyl benzoate, or the like may also be used) (see, for example, Kautsch. Gummi. Kunstst., vol. 37, pp. 377-379 (1984) and Polym. Bull., vol. 12, pp. 71-77 (1984));

<3> a process for obtaining a block copolymer (such as an A-B-A type block copolymer) by polymerizing α-methylstyrene in a nonpolar solvent using as an initiator an organolithium compound in the presence of a polar compound, polymerizing the obtained living polymer with a conjugated diene, and adding a coupling agent; and <4> a process for obtaining a block copolymer (such as A-B-C type block copolymer, with C representing a block other than the polymer blocks A and B) by polymerizing α-methylstyrene in a nonpolar solvent using as an initiator an organolithium compound in the presence of a polar compound, polymerizing the obtained living polymer with a conjugated diene, and polymerizing the obtained living polymer of the block copolymer including a polymer block mainly composed of an α-methylstyrene unit and a polymer block mainly composed of a conjugated diene unit with an anionic polymerizable monomer other than α-methylstyrene and the conjugated diene.

In the above processes, when α-methylstyrene is polymerized, an unsaturated monomer other than α-methylstyrene may be copolymerized, if necessary. In the above processes, when a conjugated diene is polymerized, an anionic polymerizable monomer other than the conjugated diene may be copolymerized, if necessary.

Of the above processes, the process <3> or <4> is preferred because of the mildness of the polymerization conditions (temperature, solution viscosity, and the like) and the controllability of the microstructure (the amount of 1,4-bonds) of the conjugate diene units. The process <3> is more preferred.

Hereinafter, the processes <3> and <4> are described in more detail.

In the processes <3> and <4>, an organolithium compound is used as a polymerization initiator. Examples of such an organolithium compound include: monolithium compounds such as n-butyl lithium, sec-butyl lithium, and tert-butyl lithium; and dilithium compounds such as tetramethylene dilithium. These compounds may be used singly or as a mixture of two or more.

Examples of the nonpolar solvent used for polymerization of α-methylstyrene include: aliphatic hydrocarbons such as cyclohexane, methylcyclohexane, n-hexane, and n-heptane; and aromatic hydrocarbons such as benzene, toluene, and xylene. These may be used singly or as a mixture of two or more.

The polar compound used for polymerization of α-methylstyrene is a compound not having a functional group (such as a hydroxy group or a carbonyl group) reactive with an anionic species but having in the molecule a hetero atom such as an oxygen atom or a nitrogen atom. Examples of the polar compound include diethyl ether, tetramethylethylenediamine, dimethoxyethane, and tetrahydrofuran. These compounds may be used singly or as a mixture of two or more.

To polymerize α-methylstyrene at a high conversion ratio and to control the amount of 1,4-bonds in the conjugated diene unit in the polymer block mainly composed of the conjugated diene unit when the conjugated diene is polymerized, the concentration of the polar compound in the reaction system is preferably in the range of 0.1 to 10 percent by mass, and more preferably in the range of 0.5 to 3 percent by mass. To obtain a predetermined polymer block, the concentration of the polar compound can be changed by adding a solvent during manufacturing of the block copolymer (a).

To polymerize α-methylstyrene at a high conversion ratio, and in terms of the viscosity of the reaction solution in the late stage of polymerization, the concentration of α-methylstyrene in the reaction system is preferably in the range of 5 to 50 percent by mass, and more preferably in the range of 25 to 40 percent by mass in the beginning of polymerization.

The conversion ratio means the ratio of the amount of α-methylstyrene converted to a polymer form during polymerization of unpolymerized α-methylstyrene. In the present invention, the conversion ratio is preferably 70 percent by mass or more, and more preferably 85 percent by mass or more.

In terms of the ceiling temperature (the temperature at which the polymerization reaction reaches an equilibrium state and does not substantially proceed) of α-methylstyrene, the polymerization rate of α-methylstyrene, the living properties, and other factors, the temperature condition during polymerization of α-methylstyrene is preferably in the range of −30 to 30° C., more preferably in the range of −20 to 10° C., and still more preferably in the range of −15 to 0° C. When the polymerization temperature is set to 30° C. or less, α-methylstyrene can be polymerized at a high conversion ratio. In addition, the deactivation ratio of the produced living polymer is small, and the mixing of homopoly-α-methylstyrene into the obtained block copolymer is suppressed, so that the properties are less likely to be impaired. When the polymerization temperature is set to −30° C. or more, an increase in the viscosity of the reaction solution is prevented, so that the reaction solution can be stirred in the late stage of the polymerization of α-methylstyrene. Therefore, the cost for maintaining a low-temperature state is not required, and this is economically preferable.

In the above processes, when α-methylstyrene is polymerized, the above-exemplified unsaturated monomer giving a structural unit that is allowed to be present in the polymer block A may also be added and copolymerized with α-methylstyrene, so long as the properties of the polymer block mainly composed of α-methylstyrene units (the polymer block A) are not impaired. One unsaturated monomer may be used alone, or two or more unsaturated monomers may be used.

The above-described polymerization of α-methylstyrene using an organolithium compound as an initiator produces living poly-α-methyl styryl lithium. Subsequently, the produced living polymer is polymerized with a conjugated diene. Examples of the conjugated diene include butadiene, isoprene, 2,3-dimethyl-1,3-butadiene, 1,3-pentadiene, and 1,3-hexadiene. These compounds may be used singly or as a mixture of two or more. Of these, butadiene or isoprene is preferred, and a mixture thereof may be used.

The conjugated diene can be polymerized by adding it to the reaction system. No particular limitation is imposed on a method for adding the conjugated diene to the reaction system. The conjugated diene can be directly added to the living poly-α-methyl styryl lithium solution or is diluted with a solvent for addition. Alternatively, after the conjugated diene is added, the resultant mixture can be diluted, or the conjugated diene and a solvent can be added at the same time. Furthermore, the conjugated diene can be added after the living poly-α-methyl styryl lithium solution is diluted with a solvent. Preferably, in a recommended method, first, the conjugated diene is added in an amount corresponding to 1 to 100 mole equivalent, and preferably 5 to 50 mole equivalent based on the living poly-α-methyl styryl lithium, whereby a polymer block mainly composed of the conjugated diene unit (hereinafter, this polymer block may be referred to as a polymer block b1') is formed and modified at the living active terminals. Subsequently, the mixture is diluted with a solvent, and the rest of the conjugated diene is added. The mixture is subjected to a polymerization reaction at a temperature of higher than 30° C., preferably in the temperature range of 40 to 80° C., whereby a polymer block mainly composed of the conjugated diene unit is further formed (hereinafter, the polymer block formed after the addition of the rest of the conjugated diene may be referred to as a polymer block b2'). To modify the living poly-α-methyl styryl lithium at the active terminals thereof, a vinyl aromatic compound such as styrene, o-methylstyrene, m-methylstyrene, p-methylstyrene, 2,4-dimethylstyrene, vinylnaphthalene, vinylanthracene, or 1,1-diphenylethylene may be used instead of the conjugated diene.

Examples of the above solvent include: aliphatic hydrocarbons such as cyclohexane, methylcyclohexane, n-hexane, and n-heptane; and aromatic hydrocarbons such as benzene, toluene, and xylene. These solvents may be used solely or as a mixture of two or more.

A triblock or radial teleblock type block copolymer (a) can be produced by reacting, for example, a coupling agent with a living polymer of the block copolymer obtained by copolymerization of the living poly-α-methyl styryl lithium with the conjugated diene, the block copolymer including the polymer block mainly composed of the α-methylstyrene unit and a polymer block mainly composed of the conjugated diene unit. The above block copolymer may be a mixture containing, in any proportion, diblock, triblock, and radial teleblock type block copolymers that are obtained by controlling the used amount of the coupling agent. Examples of the coupling agent include phenyl benzoate, methyl benzoate, ethyl benzoate, ethyl acetate, methyl acetate, methyl pivalate, phenyl pivalate, ethyl pivalate, α,α'-dichloro-o-xylene, α,α'-dichloro-m-xylene, α,α'-dichloro-p-xylene, bis(chloromethyl)ether, dibromomethane, diiodomethane, dimethyl phthalate, dichlorodimethylsilane, dichlorodiphenylsilane, trichloromethylsilane, tetrachlorosilane, and divinylbenzene. The used amount of the coupling agent may be appropriately adjusted according to the number average molecular weight of the block copolymer (a) and is not strictly limited.

The triblock or radial teleblock type block copolymer (a) obtained by reacting the coupling agent with the living polymer of the block copolymer including the polymer block mainly composed of the α-methylstyrene unit and the polymer block mainly composed of the conjugated diene unit may be hydrogenated. In such a case, if necessary, an active hydrogen compound such as an alcohol, a carboxylic acid, or water is added to terminate the coupling reaction. Subsequently, hydrogenation is performed in an inactive organic solvent in the presence of a hydrogenation catalyst according to a known method described later, whereby the hydrogenated block copolymer (a) can be produced.

Alternatively, the hydrogenated block copolymer (a) may be produced by polymerizing the living poly-α-methyl styryl lithium with the conjugated diene, adding an active hydrogen compound such as an alcohol, a carboxylic acid, or water to terminate the polymerization reaction, and performing hydrogenation in an inactive organic solvent in the presence of a hydrogenation catalyst according to a known method described later.

The block copolymers (a) used in the present invention encompasses: a non-hydrogenated block copolymer including a polymer block mainly composed of an α-methylstyrene unit and a polymer block mainly composed of a conjugated diene unit; and a non-hydrogenated triblock or radial teleblock type block copolymer obtained by reacting a coupling agent with the living polymer of a block copolymer including a polymer block mainly composed of an α-methylstyrene unit and a polymer block mainly composed of a conjugated diene unit. These non-hydrogenated block copolymers may be hydrogenated without replacing the solvent that has been used during its manufacture.

The hydrogenation reaction may be performed under the conditions of a reaction temperature of 20 to 100° C. and a hydrogen pressure of 0.1 to 10 MPa in the presence of a hydrogenation catalyst. Examples of the hydrogenation catalyst include: Raney nickel; heterogeneous catalysts in which a metal such as Pt, Pd, Ru, Rh, or Ni is supported on a carrier such as carbon, alumina, or diatomaceous earth; Ziegler type catalysts composed of combinations of transition metal compounds (such as nickel octylate, nickel naphthenate, nickel acetylacetonato, cobalt octylate, cobalt naphthenate, and cobalt acetylacetonato) with organolithium compounds or organic aluminum compounds such as triethylaluminum and triisobutylaluminum; and metallocene-based catalysts composed of combinations of bis(cyclopentadienyl) compounds of transition metals such as titanium, zirconium, and hafnium with organic metal compounds each containing lithium, sodium, potassium, aluminum, zinc, magnesium, or the like. Desirably, the non-hydrogenated block copolymer (a) is hydrogenated until 50 mole percent or more, preferably 70 mole percent or more, still more preferably 90 mole percent or more of the carbon-carbon double bonds in the polymer block mainly composed of the conjugated diene unit are saturated. In this manner, the weather resistance of the block copolymer (a) can be improved.

The block copolymer (a) obtained by the above method is preferably used in the present invention. In particular, to further improve the characteristics of the thermoplastic polymer composition over a wide temperature range, a block copolymer (a) obtained by a manufacturing method including the following process is desirable. The method includes polymerizing α-methylstyrene in a concentration of 5 to 50 percent by mass at a temperature of −30 to 30° C. in a nonpolar solvent using an organolithium compound as an initiator in the presence of a polar compound at a concentration of 0.1 to 10 percent by mass; polymerizing a conjugated diene in an amount of 1 to 100 mole equivalent with respect to the living poly-α-methyl styryl lithium to form a polymer block b1'; and then bringing the reaction system to a temperature of 30° C. or more and adding an additional amount of the conjugated diene for polymerization to form a polymer block b2'. In the above case, the polymer block B is composed of the polymer block b1' and the polymer block b2'. With the above production method, the above block copolymer (a') can be easily produced. Generally, the polymer block b1' corresponds to the block b1 of the block copolymer (a'), and the polymer block b2' corresponds to the block b2 of the block copolymer (a').

Examples of the propylene-based polymer (b) included in the thermoplastic polymer composition of the present invention include homo-polypropylene, random polypropylene, block polypropylene, atactic polypropylene, syndiotactic polypropylene, and modified products thereof. Examples of the modified products include products obtained by graft copolymerization of a propylene-based polymer with a modifier, and products obtained by copolymerizing a modifier into the main chain of a propylene-based polymer. Specific examples of the modifier include: unsaturated dicarboxylic acids such as maleic acid, citraconic acid, halogenated maleic acid, itaconic acid, cis-4-cyclohexene-1,2-dicarboxylic acid, and endo-cis-bicyclo[2.2.1]-5-heptene-2,3-dicarboxylic acid; esters, amides, and imides of unsaturated dicarboxylic acids; anhydrides of unsaturated dicarboxylic acids such as maleic anhydride, citraconic anhydride, halogenated maleic anhydride, itaconic anhydride, cis-4-cyclohexene-1,2-dicarboxylic anhydride, and endo-cis-bicyclo[2.2.1]-5-heptene-2,3-dicarboxylic anhydride; unsaturated monocarboxylic acids such as acrylic acid, methacrylic acid, and crotonic acid; and esters, amides, and imides of unsaturated monocarboxylic acids (such as methyl acrylate, ethyl acrylate, methyl methacrylate, and ethyl methacrylate). Of these, unsaturated dicarboxylic anhydrides are preferred, and maleic anhydride is more preferred. The above propylene-based polymers may be used singly or as a mixture of two or more.

Among these propylene-based polymers, homo-polypropylene, random polypropylene, and block polypropylene are preferably used because of the wear resistance of the obtained thermoplastic polymer composition, and homo-polypropylene is more preferably used. In terms of adhesive properties and coatability when a molded product of the obtained thermoplastic polymer composition is bonded to a different material with an adhesive or is coated, the above modified products are preferably used.

When the melt flow rate (MFR) of the propylene-based polymer (b) measured under the conditions of 230° C. and 21.18 N is too small, the moldability and wear resistance of the thermoplastic polymer composition tend to be impaired. Therefore, the melt flow rate is preferably 0.1 g/10 min or more. In terms of the moldability and wear resistance of the obtained thermoplastic polymer composition, the melt flow rate is more preferably in the range of 1 to 100 g/10 min, still more preferably in the range of 3 to 80 g/10 min, and particularly preferably in the range of 15 to 60 g/10 min. The MFR can be measured in accordance with JIS K 7210.

Examples of the ethylene-based polymer (c) included in the thermoplastic polymer composition of the present invention include: ethylene homopolymers such as medium density polyethylenes and low density polyethylenes (LDPEs); ethylene/α-olefin copolymers such as ethylene/1-butene copolymers, ethylene/1-hexene copolymers, ethylene/1-heptene copolymers, ethylene/1-octane copolymers, ethylene/4-methyl-1-pentene copolymers, ethylene/1-nonene copolymers, and ethylene/1-decene copolymers; ethylene/vinyl acetate copolymers; ethylene/acrylic acid copolymers; ethylene/methacrylic acid copolymers; and modified products of the above polymers and copolymers. Examples of the modified products include products obtained by graft copolymerization of an ethylene-based polymer with a modifier, and products obtained by copolymerizing a modifier into the main chain of an ethylene-based polymer. Specific examples of the modifier include: unsaturated dicarboxylic acids such as maleic acid, citraconic acid, halogenated maleic acid, itaconic acid, cis-4-cyclohexene-1,2-dicarboxylic acid, and endo-cis-bicyclo[2.2.1]-5-heptene-2,3-dicarboxylic acid; esters, amides, and imides of unsaturated dicarboxylic acids; anhydrides of unsaturated dicarboxylic acids such as maleic anhydride, citraconic anhydride, halogenated maleic anhydride, itaconic anhydride, cis-4-cyclohexene-1,2-dicarboxylic anhydride, and endo-cis-bicyclo[2.2.1]-5-heptene-2,3-dicarboxylic anhydride; unsaturated monocarboxylic acids such as acrylic acid, methacrylic acid, and crotonic acid; and esters, amides, and imides of unsaturated monocarboxylic acids (such as methyl acrylate, ethyl acrylate, methyl methacrylate, and ethyl methacrylate). Of these, unsaturated dicarboxylic anhydrides are preferred, and maleic anhydride is more preferred. The above ethylene-based polymers may be used singly or as a mixture of two or more.

Of these, in terms of the balance of the flexibility and wear resistance of the obtained thermoplastic polymer composition, an ethylene-based polymer produced using a metallocene catalyst is particularly preferably used as the ethylene-based polymer (c). In terms of adhesive properties and coatability when a molded product of the obtained thermoplastic polymer composition is bonded to a different material with an adhesive or is coated, modified products of the ethylene-based polymers are preferably used.

The density of the ethylene-based polymer (c) is 0.94 g/cm$^3$ or less. In terms of the flexibility and wear resistance, the density is preferably from 0.85 to 0.94 g/cm$^3$ and more preferably from 0.85 to 0.92 g/cm$^3$. When an ethylene-based polymer having a density greater than 0.94 g/cm$^3$ is used, the flexibility and wear resistance are low.

It is important that the thermoplastic polymer composition of the present invention contains the block copolymer (a), the propylene-based polymer (b), and the ethylene-based polymer (c) at a ratio satisfying the following inequalities (1) and (2):

$$0.1 \leq W(a)/[W(a)+W(b)+W(c)] \leq 0.8 \quad (1)$$

$$1 \leq W(b)/W(c) \quad (2)$$

wherein W(a), W(b), and W(c) represent the masses of the block copolymer (a), the propylene-based polymer (b), and the ethylene-based polymer (c), respectively.

In terms of the flexibility, moldability, and wear resistance, the value of W(a)/[W(a)+W(b)+W(c)] in the above inequality (1) is preferably in the range of 0.2 to 0.7 and more preferably in the range of 0.4 to 0.7. To further improve the wear resistance, the above value is still more preferably in the range of 0.5 to 0.7 and particularly preferably in the range of 0.5 to 0.6.

In terms of the flexibility, moldability, and wear resistance, the value of W(b)/W(c) in the above inequality (2) is preferably in the range of 2 to 7 and more preferably in the range of 3 to 6.

Therefore, preferred combinations of inequalities (1) and (2) are the following (i) to (viii), and particularly preferred combinations are the following (ix) and (x).

$$0.1 \le W(a)/[W(a)+W(b)+W(c)] \le 0.8$$

$$2 \le W(b)/W(c) \le 7 \quad \text{(i)}$$

$$0.1 \le W(a)/[W(a)+W(b)+W(c)] \le 0.8$$

$$3 \le W(b)/W(c) \le 6 \quad \text{(ii)}$$

$$0.2 \le W(a)/[W(a)+W(b)+W(c)] \le 0.7$$

$$1 \le W(b)/W(c) \quad \text{(iii)}$$

$$0.2 \le W(a)/[W(a)+W(b)+W(c)] \le 0.7$$

$$2 \le W(b)/W(c) \le 7 \quad \text{(iv)}$$

$$0.2 \le W(a)/[W(a)+W(b)+W(c)] \le 0.7$$

$$3 \le W(b)/W(c) \le 6 \quad \text{(v)}$$

$$0.4 \le W(a)/[W(a)+W(b)+W(c)] \le 0.7$$

$$1 \le W(b)/W(c) \quad \text{(vi)}$$

$$0.4 \le W(a)/[W(a)+W(b)+W(c)] \le 0.7$$

$$2 \le W(b)/W(c) \le 7 \quad \text{(vii)}$$

$$0.4 \le W(a)/[W(a)+W(b)+W(c)] \le 0.7$$

$$3 \le W(b)/W(c) \le 6 \quad \text{(viii)}$$

$$0.2 \le W(a)/[W(a)+W(b)+W(c)] \le 0.7$$

$$3 \le W(b)/W(c) \le 6 \quad \text{(ix)}$$

$$0.4 \le W(a)/[W(a)+W(b)+W(c)] \le 0.7$$

$$3 \le W(b)/W(c) \quad \text{(x)}$$

When the amount of the block copolymer (a) does not satisfy the above inequality (1), e.g., the value of W(a)/[W(a)+W(b)+W(c)] is greater than 0.8, the moldability of the obtained thermoplastic polymer composition is undesirably low. When the value is less than 0.1, the flexibility and wear resistance are undesirably low.

When the ratio [W(b)/W(c)] of the amount of the propylene-based polymer (b) to the amount of the ethylene-based polymer (c) does not satisfy the above inequality (2), i.e., less than 1, the wear resistance is undesirably low.

When the JIS-D hardness of the obtained thermoplastic polymer composition is 65 or more, it is desirable that the thermoplastic polymer composition of the present invention contain the block copolymer (a), the propylene-based polymer (b), and the ethylene-based polymer (c) at a ratio satisfying the following inequalities (3) and (4), in order to obtain good wear resistance.

$$0.1 \le W(a)/[W(a)+W(b)+W(c)] \le 0.4 \quad (3)$$

$$1 \le W(b)/W(c) \quad (4)$$

In terms of the flexibility, moldability, and wear resistance, the value of W(a)/[W(a)+W(b)+W(c)] in the above inequality (3) is more preferably in the range of 0.2 or more and less than 0.4 and still more preferably in the range of 0.2 to 0.3.

In terms of the flexibility, moldability, and wear resistance, the value of W(b)/W(c) in the above inequality (4) is more preferably in the range of 2 to 7 and still more preferably in the range of 3 to 6.

In terms of the flexibility and wear resistance of the obtained thermoplastic polymer composition of the present invention, the ratio of the total amount of the block copolymer (a), the propylene-based polymer (b), and the ethylene-based polymer (c) to the amount of the thermoplastic polymer composition is preferably in the range of 80 to 100 percent by mass, more preferably in the range of 90 to 100 percent by mass, and still more preferably in the range of 95 to 100 percent by mass.

The thermoplastic polymer composition of the present invention may be composed only of the block copolymer (a), the propylene-based polymer (b), and the ethylene-based polymer (c). However, to obtain a bulking effect and to reinforce or impart various properties such as to reinforce stiffness, to impart moldability, and to impart heat resistance, the thermoplastic polymer composition may contain any of: inorganic fillers such as talc, clay, mica, calcium silicate, glass, hollow glass spheres, glass fibers, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, alumina, titanium oxide, iron oxide, zinc oxide, magnesium oxide, tin oxide, antimony oxide, barium ferrite, strontium ferrite, carbon black, graphite, carbon fibers, activated carbon, hollow carbon spheres, calcium titanate, lead zirconate titanate, silicon carbide, and mica; organic fillers such as wood flour and starch; organic pigments; and the like.

The thermoplastic polymer composition of the present invention may contain other additives such as a thermal stabilizer, a light stabilizer, a UV absorber, an antioxidant, a lubricant, a coloring agent, an antistatic agent, a flame retardant, a foaming agent, a water repellant, a water-proofing agent, a tackifying resin, an electrical conductivity-imparting agent, a heat conductivity-imparting agent, an electromagnetic wave shielding property-imparting agent, a fluorescent agent, an antiblocking agent, and antibacterial agent.

The thermoplastic polymer composition of the present invention may be produced by kneading the block copolymer (a), the propylene-based polymer (b), the ethylene-based polymer (c), and the above components added as needed using a conventionally used kneader such as a single screw extruder, a twin screw extruder, a kneader, a Banbury mixer, or rolls. The kneading is performed in the temperature range of normally 160 to 270° C. and preferably 160 to 230° C.

The thus-obtained thermoplastic polymer composition may be molded and processed using any of various molding methods such as injection molding methods (such as insert molding, two-color molding, sandwich molding, and gas injection molding methods) and extrusion molding, inflation molding, T-die film molding, laminate molding, blow molding, hollow molding, compression molding, and calender molding methods.

The obtained molded products can be effectively used in wide variety of applications by taking advantage of their properties. Examples of such applications include: vehicle interior and exterior components such as instrument panels, rack-and-pinion boots, suspension boots, constant velocity joint boots, bumpers, side trims, weather strips, mud guards, emblems, leather seat, floor mats, arm rests, air bag covers, steering wheel covers, belt line trims, flash mounts, gears, and knobs; hoses and tubes such as pressure hoses, fire hoses, hoses for coating, washing machine hoses, fuel tubes, oil hydraulic and pneumatic hoses, and tubes for dialysis; gripping materials for various products (such as scissors, drivers, toothbrushes, pens, and cameras); home-appliance parts such as refrigerator gaskets, vacuum cleaner bumpers, cellular phone protection films, and waterproof bodies; business machine parts such as feeding rollers and winding rollers for copy machines; furniture such as sofa and chair sheets; components such as switch covers, casters, stoppers, and rubber leg covers; construction materials such as coated steel plates and coated plywood laminates; sporting goods such as swimming goggles, snorkels, ski sticks, ski boots, snowboard boots, ski and snowboard coating materials, and golf ball covers; medical supplies such as syringe gaskets and rolling tubes; industrial materials such as conveyer belts, electric belts, pelletizer rolls; stretchable parts of sanitary goods such as paper diapers, poultices, and bandages; band applications such as hair bands, wristbands, watch bands, and eyeglass bands; other goods such as snow chains, wire coating materials, trays, films, sheets, stationery, toys, and sundry goods.

EXAMPLES

Hereinafter, the present invention will be described by way of Examples and the like. However, the present invention is not limited to the Examples. The evaluation of properties in the Examples and Comparative Examples was performed in the manner described below.

(1) Evaluation of Wear Resistance (Akron Wear)

The thermoplastic polymer compositions obtained in the Examples and Comparative Examples were used to prepare sheets (110 mm long×110 mm wide×2 mm thick) by injection molding under the conditions below. Strip-like test pieces (110 mm long×11 mm wide×2 mm thick and 78 mm long×11 mm wide×2 mm thick) were cut from each obtained sheet. The obtained test pieces were applied to disk-like aluminum cores having a diameter of 60 mm and a thickness of 13 mm, and the amounts of Akron wear were measured under the temperature conditions of 23° C. and 80° C. and under the conditions of the abrasive wheel angle of 10°, the abrasive wheel load of 27.0 N, and the number of rotations of 1000 according to JIS K 6264. The smaller the amount of wear, the better the wear resistance.

(Injection Molding Conditions)
Molding temperature: 230° C.
Injection: 10 seconds
Cooling: 20 seconds
Mold temperature: 40° C.

(2) Evaluation of Mechanical Strength and Heat Resistance (Breaking Strength)

The thermoplastic polymer compositions obtained in the Examples and Comparative Examples were used to prepare sheets by injection molding in a manner similar to that in the above (1) evaluation of wear resistance. Dumbbell No. 5 test pieces specified in JIS K 6251 were punched from each obtained sheet. The obtained test pieces were subjected to tensile test under the temperature conditions of 23° C., 60° C., and 80° C. and the condition of a tensile speed of 500 mm/min to measure breaking strength (tensile breaking strength). The measured values were used as measures of mechanical strength and heat resistance.

(3) Evaluation of Flexibility (Bending Elastic Modulus)

The thermoplastic polymer compositions obtained in the Examples and Comparative Examples were used to prepare sheets (80 mm long×10 mm wide×4 mm thick) by injection molding in a manner similar to that in the above (1) evaluation of wear resistance. The obtained sheets were used as test pieces to measure the bending elastic modulus according to JIS K 7171, and the measured values were used as measures of flexibility.

(4) Evaluation of Flexibility (Hardness)

The thermoplastic polymer compositions obtained in the Examples and Comparative Examples were used to prepare sheets by injection molding in a manner similar to that in the above (1) evaluation of wear resistance. The obtained sheets were used as test pieces to measure JIS-A hardness and JIS-D hardness according to JIS K 6253, and the measured values were used as measure of flexibility.

(5) Evaluation of Lightweight Properties (Density)

The thermoplastic polymer compositions obtained in the Examples and Comparative Examples were used to prepare sheets by injection molding in a manner similar to that in the above (1) evaluation of wear resistance. The obtained sheets were used to measure density under the condition of 23° C. according to JIS K 7112, and the measured values were used as measures of lightweight properties.

(6) Evaluation of Moldability (MFR)

The thermoplastic polymer compositions obtained in the Examples and Comparative Examples were used to measure the MFR (g/10 min) under the conditions of 230° C. and a load of 21.18 N according to JIS K 7210. The measured values were used as measures of moldability.

(7) Evaluation of Coatability

The thermoplastic polymer compositions obtained in the Examples were used to prepare sheets by injection molding in a manner similar to that in the above (1) evaluation of wear resistance. Each of the obtained sheets was coated with a urethane-based coating (two-component polyurethane polyol (trade name: Takelac E-550, product of MITSUI CHEMICALS POLYURETHANES, INC.)). The coated sheet was left to stand in a thermostatic bath at 80° C. for 2 hours and then left to stand at room temperature for 72 hours. Subsequently a peel test for the coating was performed using a cross-cut tape method to evaluate the coatability. In the-cross cut tape method, a checkerboard pattern (25 sections, 2 mm square) is cut through the coating film into the substrate material. Cellophane-tape is applied to the checkerboard pattern and then peeled off, and the number of sections having the coating film remaining on the substrate material is counted.

(8) Evaluation of Adhesive Properties

The thermoplastic polymer compositions obtained in the Examples were used to prepare sheets (110 mm long×110 mm wide×2 mm thick) by injection molding in a manner similar to that in the above (1) evaluation of wear resistance. A part of each obtained sheet was coated with a UV curable primer (trade name: GE258H1, product of Great Eastern Resins Industrial Co., Ltd.), and the coated sheet was left to stand in a thermostatic bath at 60° C. for 10 minutes to dry. Subsequently, UV light (UV radiation energy: 0.5 J/cm$^2$) was applied using an irradiation apparatus (product of Japan Storage Battery Co., Ltd., 1.2 kW handy type UV irradiation apparatus) provided with a 120 W/cm high pressure mercury lamp while the sheet was moved at a conveyer speed of 1 m/min. Next, a urethane-based adhesive (trade name: SEIKABOND A-601/C-83, product of Dainichiseika Color & Chemicals Mfg. Co., Ltd.) was applied to the coated part of the sheet coated with the UV curable primer. The resultant sheet was left to stand in a thermostatic bath at 60° C. for 10 minutes to dry, and the adhesive was further applied similarly and dried under the same conditions.

A thermoplastic polyurethane (trade name: KURAMIRON 1190, product of KURARAY CO., LTD.) was used to prepare sheets (110 mm long×110 mm wide×2 mm thick) by injection molding in a manner similar to that in the above (1) evaluation of wear resistance. A part of each obtained sheet was coated with a primer (trade name: GE6001, product of Great Eastern Resins Industrial Co., Ltd.), and the coated sheet was left to stand in a thermostatic bath at 60° C. for 10 minutes to dry. Next, a urethane-based adhesive (trade name: SEIKABOND A-601/C-83, product of Dainichiseika Color & Chemicals Mfg. Co., Ltd.) was applied to the coated part of the sheet coated with the primer. The resultant sheet was left to stand in a thermostatic bath at 60° C. for 10 minutes to dry, and the adhesive was further applied similarly and dried under the same conditions.

Subsequently, the above two sheets were laminated and then compression-bonded using a hand roller. The laminated sheets were left to stand at room temperature for 72 hours, and a test piece (50 mm long (the bonded part had a length of 25 mm)×25 mm wide×4 mm thick) was punched from the sheets. The obtained test piece was subjected to 180 degree peel test using a tensile testing machine, and the tensile strength was measured to evaluate the adhesive properties.

In each of Reference Examples below, the number average molecular weight was determined as a value by GPC measurement relative to polystyrene standard performed under the following conditions.
Column: TSKgel G4000HXL (trade name)×2, product of TOSOH CORPORATION (column temperature: 40° C.)
Mobile phase: tetrahydrofuran (flow rate: 1 mL/min)
Detector: differential refractometer (a multi-wavelength detector (detection wavelength: 254 nm) is further connected)
Standard material: TSK standard polystyrene, product of TOSOH CORPORATION
Sample concentration: 0.06 percent by mass
The components used in the Examples and Comparative Examples are as follows.

Reference Example 1

Production of Block Copolymer (a)-I

A pressure container inside of which had been replaced with nitrogen and which was equipped with an agitator was charged with 90.9 g of α-methylstyrene, 138 g of cyclohexane, 15.2 g of methylcyclohexane, and 3.1 g of tetrahydrofuran. To the mixed liquid, 9.4 mL of sec-butyl lithium (1.3M cyclohexane solution) was added, and the resultant mixture was subjected to polymerization at −10° C. for 3 hours. The number average molecular weight of poly-α-methylstyrene (the polymer block A) was measured 3 hours after polymerization starting time by GPC. The number average molecular weight relative to polystyrene standard was 6,600, and the conversion ratio of α-methylstyrene was 89%.

Subsequently, 23 g of butadiene was added to the reaction mixture. The resultant mixture was stirred at −10° C. for 30 minutes and polymerized to form the block b1, and then 930 g of cyclohexane was added thereto. The polymerization conversion ratio of α-methylstyrene at this point was 89%. The number average molecular weight (GPC measurement relative to polystyrene standard) of the polybutadiene block (b1) was 3,700, and the amount of 1,4-bonds therein was 19 mole percent as determined by $^1$H-NMR measurement.

Subsequently, 141.3 g of butadiene was further added to the reaction mixture to perform polymerization reaction at 50° C. for 2 hours. The number average molecular weight (GPC measurement relative to polystyrene standard) of the polybutadiene block (b2) of the block copolymer (structure: A-b1-b2) sampled at this point was 29,800, and the amount of 1,4-bonds therein was 60 mole percent as determined by $^1$H-NMR measurement.

Next, to the polymerization reaction mixture, 12.2 mL of dichlorodimethylsilane (0.5M toluene solution) was added, and the resultant mixture was stirred at 50° C. for 1 hour to give a poly-α-methylstyrene-polybutadiene-poly-α-methylstyrene triblock copolymer. The coupling efficiency at this point was computed from the ratio between the UV absorption area in GPC performed on the coupled product (poly-α-methylstyrene-polybutadiene-poly-α-methylstyrene triblock copolymer: A-b1-b2-X-b2-b1-A; wherein X represents the residue of the coupling agent (—Si(Me$_2$)—), the number average molecular weight: 81,000) and the UV absorption area in GPC performed on the unreacted block copolymer (poly-α-methylstyrene-polybutadiene block copolymer: A-b1-b2, the number average molecular weight: 41,000). The coupling efficiency was 94 percent by mass (the number average molecular weight of the coupled product and unreacted block copolymer as a whole: 78,600). The results of $^1$H-NMR analysis show that the amount of the poly-α-methylstyrene block in the poly-α-methylstyrene-polybutadiene-poly-α-methylstyrene triblock copolymer was 33 percent by mass and that the amount of 1,4-bonds in the polybutadiene block (the polymer block B) as a whole (i.e., the blocks b1 and b2) was 56 mole percent.

A Ziegler hydrogenation catalyst formed of nickel octylate and triethylaluminum was added to the obtained polymerization reaction mixture in a hydrogen atmosphere, and a hydrogenation reaction was performed at 80° C. and a hydrogen pressure of 0.8 MPa for 5 hours to give a hydrogenated product of the α-methylstyrene-butadiene block copolymer (hereinafter, the hydrogenated product is referred to as a block copolymer (a)-I). The obtained block copolymer (a)-I was subjected to GPC measurement. The results show that the main component was the hydrogenated product (coupled product) of the poly-α-methylstyrene-polybutadiene-poly-α-methylstyrene triblock copolymer with Mt (peak top molecular weight)=81,000, Mn (number average molecular weight)=78,700, Mw (weight average molecular weight)=79,500, and MW/Mn=1.01. The results also show that the obtained block copolymer (a)-I contained the coupled product in an amount of 94 percent by mass as determined by the ratio of UV (254 nm) absorption areas in GPC. The hydrogenation ratio of the polybutadiene block (the polymer block B) composed of the blocks b1 and b2 was 99 mole percent as determined by $^1$H-NMR measurement. These molecular characteristics are summarized in Table 1.

Reference Example 2

Production of Block Copolymer-II

A pressure container inside of which had been replaced with nitrogen and which was equipped with an agitator was charged with 81 g of styrene, 1,100 g of cyclohexane, and 3.1 g of tetrahydrofuran. To this solution, 9.4 mL of sec-butyl lithium (1.3M cyclohexane solution) was added, and the resultant mixture was subjected to polymerization at 50° C. for 1 hour. Subsequently, 164.3 g of butadiene was added to the reaction mixture, and the resultant mixture was subjected to polymerization at 50° C. for 1 hour. Then, to the reaction mixture, 12.2 mL of dichlorodimethylsilane (0.5M, toluene solution) was added, and the resultant mixture was stirred at 50° C. for 1 hour to give a reaction mixture containing a polystyrene-polybutadiene-polystyrene triblock copolymer. A hydrogenation catalyst composed of nickel octylate-triethylaluminum was added to the reaction mixture, and a hydrogenation reaction was performed at 80° C. and a hydrogen pressure of 0.8 MPa for 5 hours to give a hydrogenated product of a block copolymer containing as a main component the polystyrene-polybutadiene-polystyrene triblock copolymer (the number average molecular weight: 85,000) (hereinafter, this hydrogenated product is referred to as a block copolymer-II). The molecular characteristics are summarized in Table 1.

TABLE 1

| Block copolymer | Polymer block A (aromatic vinyl block) | Amount of 1,4-bonds (mole percent) | Hydrogenation ratio (mole percent) |
|---|---|---|---|
| (a)-I | Poly(α-methylstyrene) | 56 | 99 |
| II | Polystyrene | 60 | 98 |

<Propylene-Based Polymers (b)>
Propylene-Based Polymer (b)-I
Polypropylene (trade name: NOVATEC-PP MA3, product of Japan Polypropylene Corporation, MFR=11 g/10 min (230° C., 21.18 N), density: 0.90 g/cm$^3$)
Propylene-Based Polymer (b)-II
Polypropylene (trade name: NOVATEC-PP MA1B, product of Japan Polypropylene Corporation, MFR=21 g/10 min (230° C., 21.18 N), density: 0.90 g/cm$^3$)
Propylene-Based Polymer (b)-III
Polypropylene (trade name: J108M, product of Prime Polymer Co., Ltd., MFR=45 g/10 min (230° C., 21.18 N), density: 0.91 g/cm$^3$)
Propylene-Based Polymer (b)-IV
Maleic anhydride-modified polypropylene (trade name: ADMER QF500, product of Mitsui Chemicals, Inc., MFR=3.0 g/10 min (230° C., 21.18 N), density: 0.90 g/cm$^3$)

<Ethylene-Based Polymers>
Ethylene-Based Polymer (c)-I
Metallocene-based linear low density polyethylene (LLDPE) (trade name: Sumikathene E FV402, product of Sumitomo Chemical Co., Ltd., MFR=4.0 g/10 min (190° C., 21 N), density: 0.92 g/cm$^3$)
Ethylene-Based Polymer (c)-II
Linear low density polyethylene (LLDPE) (trade name: NOVATEC-LL UJ990, product of Japan Polyethylene Corporation, MFR=35 g/10 min (190° C., 21 N), density: 0.94 g/cm$^3$)
Ethylene-Based Polymer (c)-III
Maleic anhydride-modified polyethylene (trade name: ADMER NF308, product of Mitsui Chemicals, Inc., MFR=1.7 g/10 min (190° C., 21 N), density: 0.93 g/cm$^3$)
Ethylene-Based Polymer-III
High density polyethylene (HDPE) (trade name: NOVATEC-HD HJ490, product of Japan Polyethylene Corporation, MFR=20 g/10 min (190° C., 21 N), density: 0.96 g/cm$^3$)

Examples 1 to 10 and Comparative Examples 1 to 11

First, a block copolymer, a propylene-based polymer, and an ethylene-based polymer were simultaneously mixed at the ratios shown in Tables 2 and 3 below using a Henschel mixer. Each obtained mixture was supplied to a twin screw extruder (product of TOSHIBA MACHINE CO., LTD., TEM-35B) and kneaded at 230° C. The resultant mixture was extruded into a strand form and cut to prepare a pellet-like thermoplastic polymer composition. The MFR of the obtained thermoplastic polymer composition was measured, and the measurement results are shown in Tables 2 and 3.

Next, the obtained thermoplastic polymer composition was used to produce a predetermined molded product under the conditions of a cylinder temperature of 230° C. and a mold temperature of 40° C. using an injection molding apparatus (product of TOSHIBA MACHINE CO., LTD., IS-55EPN). The wear resistance, tensile breaking strength, bending elastic modulus, hardness, and density were measured by the above-described methods. For Examples 2, 9, and 10, the coatability and adhesive properties were also evaluated. The measurement results are shown in Tables 2 and 3.

TABLE 2

| | | Example | | | | | | | | | |
|---|---|---|---|---|---|---|---|---|---|---|---|
| | | 1 | 2 | 3 | 4 | 5 | 6 | 7 | 8 | 9 | 10 |
| Block copolymer (a)-I | Parts by mass | 70 | 55 | 45 | 45 | 30 | 20 | 55 | 55 | 55 | 55 |
| Block copolymer II | Parts by mass | | | | | | | | | | |
| Propylene-based polymer (b)-I | Parts by mass | 20 | 35 | 45 | 45 | 60 | 70 | | | 20 | 20 |
| Propylene-based polymer (b)-II | Parts by mass | | | | | | | 35 | | | |
| Propylene-based polymer (b)-III | Parts by mass | | | | | | | | 35 | | |
| Propylene-based polymer (b)-IV | Parts by mass | | | | | | | | | 15 | 15 |
| Ethylene-based polymer (c)-I | Parts by mass | 10 | 10 | 10 | | 10 | 10 | 10 | 10 | 10 | |
| Ethylene-based polymer (c)-II | Parts by mass | | | | 10 | | | | | | |
| Ethylene-based polymer (c)-III | Parts by mass | | | | | | | | | | 10 |
| Ethylene-based polymer III | Parts by mass | | | | | | | | | | |
| Wear resistance | | | | | | | | | | | |
| Akron wear (23° C.) | mm$^3$ | 5.0 | 3.4 | 8.0 | 8.3 | 8.4 | 8.4 | 3.0 | 3.2 | 3.5 | 3.6 |
| Akron wear (80° C.) | mm$^3$ | 5.5 | 4.3 | 9.8 | 10.0 | 10.2 | 10.2 | 3.8 | 4.1 | 4.3 | 5.0 |

TABLE 2-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| Tensile breaking strength | | | | | | | | | | | |
| 23° C. | MPa | 32 | 36 | 37 | 35 | 37 | 37 | 36 | 35 | 35 | 36 |
| 60° C. | MPa | 16 | 16 | 18 | 16 | 18 | 18 | 16 | 15 | 15 | 15 |
| 80° C. | MPa | 12 | 12 | 13 | 11 | 13 | 14 | 12 | 11 | 12 | 12 |
| Bending elastic modulus | MPa | 40 | 250 | 380 | 350 | 700 | 900 | 280 | 240 | 220 | 220 |
| Hardness | | | | | | | | | | | |
| JIS-A | | 86 | 95 | 95 | 94 | 98 | 99 | 95 | 95 | 94 | 93 |
| JIS-D | | 50 | 52 | 60 | 59 | 67 | 72 | 53 | 52 | 50 | 50 |
| Density | g/cm$^3$ | 0.91 | 0.91 | 0.91 | 0.91 | 0.91 | 0.91 | 0.91 | 0.91 | 0.91 | 0.91 |
| MFR | g/10 min | 7.5 | 8.0 | 8.0 | 10 | 12 | 15 | 11 | 11 | 7.8 | 7.9 |
| Coatability | The number out of 25 | | 10 | | | | | | | 24 | 25 |
| Adhesive properties | N/25 mm | | 75 | | | | | | | 130 | 140 |

TABLE 3

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Block copolymer (a)-I | Parts by mass | 70 | 55 | 45 | 45 | 30 | 20 | 50 | 50 | 45 | 45 | |
| Block copolymer II | Parts by mass | | | | | | | | | | | 45 |
| Propylene-based polymer (b)-I | Parts by mass | 10 | 10 | 10 | 10 | 10 | 10 | 50 | | 10 | 45 | 45 |
| Propylene-based polymer (b)-II | Parts by mass | | | | | | | | | | | |
| Propylene-based polymer (b)-III | Parts by mass | | | | | | | | | | | |
| Propylene-based polymer (b)-IV | Parts by mass | | | | | | | | | | | |
| Ethylene-based polymer (c)-I | Parts by mass | 20 | 35 | 45 | | 60 | 70 | | 50 | | | 10 |
| Ethylene-based polymer (c)-II | Parts by mass | | | | 45 | | | | | | | |
| Ethylene-based polymer (c)-III | Parts by mass | | | | | | | | | | | |
| Ethylene-based polymer III | Parts by mass | | | | | | | | | 45 | 10 | |
| Wear resistance | | | | | | | | | | | | |
| Akron wear (23° C.) | mm$^3$ | 8.8 | 8.8 | 8.9 | 9.0 | 9.1 | 9.2 | 9.0 | 9.5 | 9.5 | 8.9 | 9.0 |
| Akron wear (80° C.) | mm$^3$ | 11.0 | 11.5 | 12.2 | 12.4 | 12.6 | 12.5 | 11.0 | 12.5 | 12.6 | 11.0 | 13.3 |
| Tensile breaking strength | | | | | | | | | | | | |
| 23° C. | MPa | 25 | 29 | 30 | 28 | 30 | 31 | 36 | 24 | 28 | 36 | 30 |
| 60° C. | MPa | 12 | 13 | 15 | 12 | 15 | 14 | 18 | 12 | 14 | 18 | 9 |
| 80° C. | MPa | 7 | 7 | 9 | 8 | 8 | 8 | 11 | 6 | 8 | 12 | 4 |
| Bending elastic modulus | MPa | 30 | 75 | 100 | 80 | 120 | 140 | 420 | 100 | 420 | 430 | 360 |
| Hardness | | | | | | | | | | | | |
| JIS-A | | 85 | 94 | 94 | 94 | 95 | 96 | 96 | 90 | 96 | 96 | 95 |
| JIS-D | | 40 | 41 | 42 | 45 | 45 | 46 | 60 | 41 | 45 | 61 | 60 |
| Density | g/cm$^3$ | 0.91 | 0.91 | 0.91 | 0.91 | 0.91 | 0.91 | 0.91 | 0.91 | 0.93 | 0.91 | 0.91 |
| MFR | g/10 min | 8.0 | 7.5 | 10 | 9.0 | 11 | 13 | 11 | 8.0 | 13 | 11 | 6.0 |

As can be seen from the above results, the thermoplastic polymer compositions of Examples 1 to 10 containing the block copolymer (a), the propylene-based polymer (b), and the ethylene-based polymer (c) at a ratio satisfying the above inequalities (1) and (2) and the molded products thereof are excellent in flexibility, lightweight properties, moldability, and heat resistance and, in particular, excellent in wear resistance. Furthermore, the thermoplastic polymer compositions of Examples 9 and 10 in which maleic anhydride-modified polypropylene was used as a part of the propylene-based polymer (b) and the molded products thereof, in particular, are also excellent in coatability and adhesive properties. In Example 10 in which maleic anhydride-modified polyethylene was further used, the coatability and adhesive properties were further improved.

However, in the thermoplastic polymer compositions of Comparative Examples 1 to 6, the above inequality (2) [1≤W(b)/W(c)] is not satisfied. Therefore, the wear resistance was found to be poor. The thermoplastic polymer composition of Comparative Examples 7 and 8 do not contain the ethylene-based polymer (c) or the propylene-based polymer (b), which are essential ingredients. Therefore, the wear resistance was found to be poor. In the thermoplastic polymer composition of Comparative Example 9, the above inequality (2) [1≤W(b)/W(c)] is not satisfied, and the density of the ethylene-based polymer (c) is greater than 0.94 g/cm$^3$. Therefore, the wear resistance was found to be poor. In the thermoplastic polymer composition of Comparative Example 10, the above inequality (1) [0.1≤W(a)/[W(a)+W(b)+W(c)]≤0.8] and inequality (2) [1≤W(b)/W(c)] are satisfied, but the density of the ethylene-based polymer, which is an essential ingredient, is greater than 0.94 g/cm$^3$. Therefore, the wear resistance was found to be poor. The thermoplastic polymer composition of Comparative Example 11 contains a block copolymer not including a polymer block composed of an α-methylstyrene unit. Therefore, the wear resistance was found to be poor.

INDUSTRIAL APPLICABILITY

The thermoplastic polymer composition of the present invention is excellent in flexibility, lightweight properties, moldability, and heat resistance and, in particular, excellent in wear resistance. Therefore, the thermoplastic polymer composition can be effectively used in a wide variety of applications such as vehicle interior and exterior components, home-appliance parts, business machine parts, furniture, construction materials, sporting goods, medical supplies, industrial materials, stretchable parts of sanitary goods, films, sheets, stationery, toys, and sundry goods.

The invention claimed is:

1. A thermoplastic polymer composition comprising:
at least one block copolymer (a) which is a hydrogenated product of an α-methylstyrene block copolymer having a number average molecular weight of 30,000 to 500,000, wherein the α-methylstyrene block copolymer comprises a polymer block A comprising an α-methylstyrene unit and a polymer block B comprising a conjugated diene unit;
a propylene polymer (b); and
an ethylene polymer (c) having a density of 0.94 g/cm³ or less, in a ratio satisfying the inequalities (1) and (2):

$$0.1 \leq W(a)/[W(a)+W(b)+W(c)] \leq 0.8 \quad (1)$$

$$1 \leq W(b)/W(c) \quad (2)$$

wherein W(a), W(b), and W(c) represent masses of the block copolymer (a), the propylene polymer (b), and the ethylene polymer (c), respectively,
wherein polymer block A has a number average molecular weight of 1,000 to 50,000,
wherein the polymer block B comprises (1) a block b1 having a number average molecular weight of 1,000 to 30,000 and having a conjugated diene unit in which an amount of 1,4-bonds is less than 30 mole percent and (2) a block b2 having a number average molecular weight of 10,000 to 400,000 and having a conjugated diene unit in which an amount of 1,4-bonds is 30 mole percent or more,
wherein the α-methylstyrene block copolymer has an (A-b1-b2) structure, and
wherein the thermoplastic polymer composition has a wear resistance of 3.0 to 8.4 mm³ (23° C.) and 3.8 to 10.2 mm³ (80° C.).

2. The thermoplastic polymer composition according to claim 1, wherein the ethylene polymer (c) is produced in the presence of a metallocene catalyst.

3. The thermoplastic polymer composition according to claim 1, wherein the ethylene polymer (c) is produced in the presence of a metallocene catalyst.

4. The thermoplastic polymer composition according to claim 1, wherein the polymer block A consists of α-methylstyrene.

5. The thermoplastic polymer composition according to claim 1, wherein the polymer block A further comprises at least one unsaturated monomer unit selected from the group consisting of butadiene, isoprene, 2,3-dimethyl-1,3-butadiene, 1,3-pentadiene, 1,3-hexadiene, isobutylene, styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylene norbornene, and 2-methylene tetrahydrofuran.

6. The thermoplastic polymer composition according to claim 1, wherein the polymer block A has a number average molecular weight before hydrogenation of 2,000 to 40,000.

7. The thermoplastic polymer composition according to claim 1, wherein the polymer block B consists of structural units derived from a conjugated diene.

8. The thermoplastic polymer composition according to claim 1, wherein the polymer block B comprises at least one conjugated diene unit selected from the group consisting of butadiene, isoprene, 2,3-dimethyl-1,3-butadiene, 1,3-pentadiene, and 1,3-hexadiene.

9. The thermoplastic polymer composition according to claim 1, wherein the polymer block B further comprises an anionic polymerizable monomer unit.

10. The thermoplastic polymer composition according to claim 9, wherein the anionic polymerizable monomer unit is at least one selected from the group consisting of styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylene norbornene, and 2-methylene tetrahydrofuran.

11. The thermoplastic polymer composition according to claim 1, wherein the polymer block A and the polymer block B are linearly linked.

12. The thermoplastic polymer composition according to claim 1, wherein the block copolymer (a) further comprises at least one functional group selected from the group consisting of carboxyl, hydroxyl, acid anhydride, amino, and epoxy.

13. The thermoplastic polymer composition according to claim 1, wherein the propylene polymer (b) is at least one selected from the group consisting of homo-polypropylene, random polypropylene, block polypropylene, atactic polypropylene, and syndiotactic polypropylene.

14. The thermoplastic polymer composition according to claim 1, wherein the ethylene polymer (c) is at least one selected from the group consisting of ethylene homopolymer, ethylene/α-olefin copolymer, ethylene/vinyl acetate copolymer, ethylene/acrylic acid copolymer, and ethylene/methacrylic acid copolymer.

15. The thermoplastic polymer composition according to claim 14, wherein the ethylene/α-olefin copolymer is at least one selected from the group consisting of ethylene/1-butene copolymer, ethylene/1-hexene copolymer, ethylene/1-heptene copolymer, ethylene/1-octane copolymer, ethylene/4-methyl-1-pentene copolymer, ethylene/1-nonene copolymer, and ethylene/1-decene copolymer.

16. The thermoplastic polymer composition according to claim 1, wherein the inequality (1) is within the range of 0.2 to 0.7.

17. The thermoplastic polymer composition according to claim 1, wherein the inequality (2) is within the range of 2 to 7.

18. An injection molded article formed of a thermoplastic polymer composition comprising:
at least one block copolymer (a) which is a hydrogenated product of an α-methylstyrene block copolymer having a number average molecular weight of 30,000 to 500,000, wherein the α-methylstyrene block copolymer comprises a polymer block A comprising an α-methylstyrene unit and a polymer block B comprising a conjugated diene unit;
a propylene polymer (b); and
an ethylene polymer (c) having a density of 0.94 g/cm³ or less, in a ratio satisfying the inequalities (1) and (2):

$$0.1 \leq W(a)/[W(a)+W(b)+W(c)] \leq 0.8 \quad (1)$$

$$1 \leq W(b)/W(c) \quad (2)$$

wherein W(a), W(b), and W(c) represent masses of the block copolymer (a), the propylene polymer (b), and the ethylene polymer (c), respectively, wherein polymer block A has a number average molecular weight of 1,000 to 50,000, wherein the polymer block B comprises (1) a block b1 having a number average molecular weight of 1,000 to 30,000 and having a conjugated diene unit in which an amount of 1,4-bonds is less than 30 mole percent and (2) a block b2 having a number average molecular weight of 10,000 to 400,000 and having a conjugated diene unit in which an amount of 1,4-bonds is 30 mole percent or more, wherein the α-methylstyrene block copolymer has an (A-b1-b2) structure, and wherein the thermoplastic polymer composition has a wear resistance of 3.0 to 8.4 mm$^3$ (23° C.) and 3.8 to 10.2 mm$^3$ (80° C.).

* * * * *

UNITED STATES PATENT AND TRADEMARK OFFICE
CERTIFICATE OF CORRECTION

PATENT NO. : 8,933,174 B2
APPLICATION NO. : 12/598600
DATED : January 13, 2015
INVENTOR(S) : Miwa et al.

Page 1 of 1

It is certified that error appears in the above-identified patent and that said Letters Patent is hereby corrected as shown below:

On the title page, Item (73), should read:

-- (73) Kuraray Co., Ltd., Kurashiki-shi (JP) --

Signed and Sealed this
Twenty-eighth Day of April, 2015

Michelle K. Lee
*Director of the United States Patent and Trademark Office*